(12) United States Patent
Taylor et al.

(10) Patent No.: US 12,019,430 B2
(45) Date of Patent: Jun. 25, 2024

(54) METAL ADDITIVE MANUFACTURING QUALIFICATION TEST ARTIFACT

(71) Applicant: Board of Regents, The University of Texas System, Austin, TX (US)

(72) Inventors: Hunter Taylor, El Paso, TX (US); Ryan Wicker, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 150 days.

(21) Appl. No.: 17/305,290

(22) Filed: Jul. 2, 2021

(65) Prior Publication Data

US 2022/0004173 A1 Jan. 6, 2022

Related U.S. Application Data

(60) Provisional application No. 63/047,635, filed on Jul. 2, 2020.

(51) Int. Cl.
*G05B 19/418* (2006.01)
*B33Y 80/00* (2015.01)

(52) U.S. Cl.
CPC ........ *G05B 19/41875* (2013.01); *B33Y 80/00* (2014.12); *G05B 2219/32368* (2013.01); *G05B 2219/45028* (2013.01)

(58) Field of Classification Search
CPC .... G05B 19/41875; G05B 2219/32368; G05B 2219/45028; B33Y 80/00; B33Y 40/00; Y02P 10/25; Y02P 90/02; B22F 10/14; B22F 10/28
See application file for complete search history.

(56) References Cited

U.S. PATENT DOCUMENTS

2018/0154580 A1* 6/2018 Mark ..................... B22D 11/01

* cited by examiner

*Primary Examiner* — Rick K Chang
(74) *Attorney, Agent, or Firm* — Yee & Associates, P.C.

(57) ABSTRACT

A test artifact for additive manufacturing is provided. The artifact comprises an additively manufactured singular continuous body between 100 cc and 6 cc in bounding box volume and between 50 cc and 3 cc in solid body. The body comprises at least three fiducials positioned for identification of locations in cross-section after sectioning of the artifact and at least three geometries that are unique from each other when exposed in cross section.

22 Claims, 11 Drawing Sheets

METAL ADDITIVE MANUFACTURING QUALIFICATION TEST ARTIFACT

CROSS-REFERENCE TO RELATED APPLICATION

This application claims the benefit of priority to U.S. Provisional Patent Application No. 63/047,635, filed Jul. 2, 2020, the entire contents of which are incorporated herein by reference.

BACKGROUND INFORMATION

1. Field

The present disclosure relates to additive manufacturing, and more specifically, to an artifact for qualification testing of additive manufacturing processes.

2. Background 3D printing (additive manufacturing), of metal components via powder bed fusion (PBF) has reached a maturity sufficient for serialized production of components that can achieve Federal Aviation Administration (FAA) and Food and Drug Administration (FDA) certification. In spite of the ability of PBF to produce quality components, there are significant gaps in standardization and a general lack of understanding relating to process sensitivity. In many cases, the existing standards leave the work to certify a part or qualify a machine up to the supplier/buyer determined criteria or machine manufacturer. This process must be supported by an extensive testing plan requiring the production of many witness coupons and sacrificial components that are then subjected to destructive testing such as the procedure laid out in NASA MFSC-STD-3716 and MFSC-STD-3717. This approach is costly from both financial and time considerations, preventing wider adoption of metal additive manufacturing (AM). Since qualification and certification of AM parts are often led and financed by the supplier, suppliers are incentivized to keep any data generated proprietary, leaving large gaps in fundamental and practical knowledge across government and industry.

Certification at the part level requires qualification of the multiple inputs or variables affecting the process, which must include feedstock, manufacturing systems, component design, operators, and the overall production facility. Due to limited fundamental understanding between the various factors that can affect a build and the final part performance, the certification process is unique to the part, machine, material, and facility.

Therefore, it would be desirable to have a method and apparatus that take into account at least some of the issues discussed above, as well as other possible issues.

SUMMARY

An illustrative embodiment provides a test artifact for additive manufacturing. The artifact comprises an additively manufactured singular continuous body between 100 cc and 6 cc in bounding box volume and between 50 cc and 3 cc in solid body. The body comprises at least three fiducials positioned for identification of locations in cross-section after sectioning of the artifact and at least three geometries that are unique from each other when exposed in cross section.

Another illustrative embodiment provides a testing method for additive manufacturing. The method comprises additively manufacturing a singular continuous body between 100 cc and 6 cc in bounding box volume and between 50 cc and 3 cc in solid body. The body comprises at least three fiducials positioned for identification of locations in cross-section after sectioning of the artifact and at least three geometries that are unique from each other when exposed in cross section. The continuous body is sectioned and at least one of mechanical or chemical tests of features of the artifact are performed.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1A:
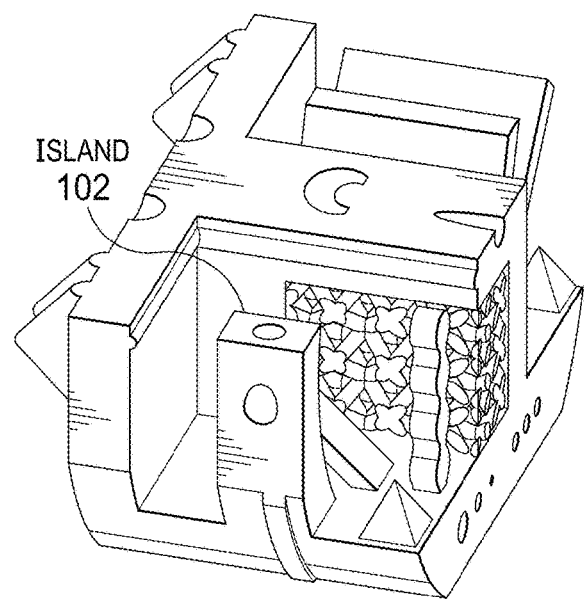
FIG. 1A depicts an isometric view of a design of a partial artifact including an "island" feature in accordance with an illustrative embodiment.

Aspects of the illustrative embodiments are described herein with reference to diagrams of methods and apparatuses according to embodiments of the invention. The diagrams in the figures illustrate the architecture and possible implementation methods according to various illustrative embodiments.

The illustrative embodiments recognize and take into account one or more different considerations. For example, the illustrative embodiments recognize and take into account that current qualification of additively manufactured parts requires production of many witness coupons and sacrificial components that must be subjected to destructive testing such as the procedure laid out in NASA MFSC-STD-3716 and MFSC-STD-3717, which is costly from both financial and time considerations.

The illustrative embodiments also recognize and take into account that certification at the part level requires qualification of the multiple inputs or variables affecting the process, and due to limited understanding between the various factors that affect final part performance, the certification process is typically unique to the part, machine, material, and facility.

The illustrative embodiments also recognize and take into account that to reduce the time to certification, it is important to develop a fundamental understanding of how process variations influence the outcome. To help focus effort on these issues, America Makes and American National Standards Institute (ANSI) created the Additive Manufacturing Standardization Committee (AMSC) Standardization Roadmap for Additive Manufacturing, identifying 93 gaps with lack of published standards, with over 60 needing further R&D. The National Institute of Standards and Technology (NIST) has multiple ongoing efforts to develop the fundamental understanding in AM as it relates to fatigue, part qualification, and machine qualification to help fill the R&D needs noted in the Standardization Roadmap. The AM Part Qualification project at NIST is intended to address the difficulties in measurement of relevant AM parts that have complex features such as lattice structures and topology optimized designs, and to produce curated datasets, measurement tools, and protocols that will enable part qualification. The NIST effort involves the development of test artifacts that enable testing of these features.

The illustrative embodiments also recognize and take into account that a key aspect of all R&D and qualification efforts includes the use of test artifacts that allow for easy and standardized inspection of features relevant to the manufacturing process, but the vast majority of test artifacts used are simple geometries such as density cubes. Test artifacts for AM have been in use since the early 1990s soon after 3D printing was commercialized, and they fall into three basic categories to date: geometric, mechanical, and process artifacts. The majority of test artifacts have been designed to be process agnostic with a focus on geometric accuracy leaving gaps in relevant data collection for PBF, which may also be why there is not a widely accepted common test artifact for PBF. The most widely cited test artifact to date was created by NIST in 2012 and consists of a large flat plate with a variety of features to quantify geometric accuracy and minimum feature size. In June 2019, ISO/American Society for Testing and Materials (ASTM) released "ISO/ASTM 52902:2019(E) Additive manufacturing—test artifacts— Geometric capability assessment of additive manufacturing systems," which may see wider adoption as it evaluates certain possible machine errors with specific parts and includes a reference part for surface roughness as a function of overhang angle.

The illustrative embodiments also recognize and take into account that the PBF process and subsequent post processing (thermal and mechanical) dictate both macro and microstructure which control the properties and ultimately the performance of the component. The PBF process allows for increased design freedom and promotes design optimization through material reduction, topology optimization, and more, leading to the creation of features that inherently experience different thermal conditions throughout the building process. These differences help create fabrication-induced anisotropic performance and properties in the manufactured components.

The illustrative embodiments also recognize and take into account that several major test artifact design considerations (in addition to geometry and surface roughness) that are not generally quantified in current test artifacts but have been shown to impact performance include, without limitation: 1) Microstructure as a function of part geometry, 2) Chemical composition, 3) Powder removal from internal channels, 4) Pressure drop through printed flow passages, 5) Residual stress approximations, 6) Mechanical properties, 7) Integrity of various internal and external surfaces, and 8) Auto-distortion analysis.

A critical barrier preventing wider adoption and implementation of metal additive manufacturing is the lack of anomaly size distribution and frequency of occurrence in terms of AM materials and processes. The design freedom of laser powder bed fusion (LPBF) and known anisotropy associated with geometry and building locations and directions require location-specific anomaly distributions be developed which can then be used to create realistic exceedance curves. Southwest Research Institute, for example, developed Design Assessment of Reliability with Inspection (DARWIN) used to predict failures for casting of critical components. DARWIN adopted a zone-based approach to probability of anomaly and probability to failure based on facture mechanics and if there is an anomaly in the zone. A zone is defined as a sub-volume within a larger volume of the contiguous body that has potentially varying geometry from the neighboring sub-volume. It would be logical for AM to adopt a similar methodology. The successful implementation of such an approach requires detailed understanding of material properties and anomaly distribution in terms of specific geometries, feedstock, machines, scan strategy, and numerous other factors. The illustrative embodiments provide a test artifact specific to LPBF that can be effectively used to develop this detailed understanding. The illustrative embodiments can be used to optimize upskin and downskin additive manufacturing as well as scanning strategies in general.

In light of the above, the illustrative embodiments provide an LPBF specific test artifact that addresses multiple standards gaps and research needs. Additionally, the artifact was designed to fulfil several functional constraints to aid in global adoption including low production cost and designed for ease of use, compact size, and functionality. The artifact may serve as a platform to establish zone-specific anomaly distributions ultimately reducing risk in adoption of LPBF for critical applications.

The test artifact was designed to directly or indirectly address needs noted in 13 AMSC standards gaps as highlighted in Table 1. Table 1 includes 13 specific AMSC standards gaps that can be addressed through use of a test artifact along with the specific needs within the gap that can be addressed and the feature(s) to be included in the test artifact to address those needs.

TABLE 1

AMSC Gaps:

| AMSC Gap | Need | Features to Address Need |
|---|---|---|
| Gap P4: Surface Finish | Standards for measurement of surface characteristics, specifically on lattice structures and internal channels | Overhang(s), lattice(s), internal channel(s) |
| Gap FMP1: Material Properties | Develop standards to establish minimum mechanical properties | ASTM E8 sub size tensile bars |
| Gap FMP3: Cleanliness of Medical AM Parts | Test methods, metrics, and acceptance criteria to establish cleanliness of complex 3D objects | Lattice(s) and internal channel(s) |
| Gap FMP4: Design Allowables | Test methods to support development of design allowables to include new coupons if necessary | ASTM E8 sub size tensile bars |
| Gap FMP5 Finished Material Properties: Microstructure | Microstructure, anomaly type and frequency as a function of geometry | Cross section in XY, XZ and YZ planes |
| Gap PC4: Machine Qualification | Development of machine qualification standards beyond fit and form to include chemical composition, residual stress, microstructure, surface integrity, and fine features. | Lattice(s), overhang(s), bulk areas, residual stress overhang, chemical test coupons, ASTM E8 tensile bars |
| Gap PC5: Parameter Control | Demonstrate process parameters can produce repeatable results | Overall Part |
| Gap PC16: In-Process Monitoring | Standardize the approach to turn in-process monitoring into an accurate 3D representation of the part. | Overall Part |
| Gap D5: Support for Customizable Guidelines | Customizable guidelines for a machine, alloy chemistry or application | Overall Part |
| Gap D7: Design Guide for Post Processing | Standards for heat treatment and surface finishing techniques on internal and external features | Overall Part (specific features: internal channel, lattice(s) and overhang(s) |
| Gap D8: Machine Input and Capability Report | For a given material and machine, what is achievable in terms of quality. | Overall Part |
| Gap D9: AM Simulation Benchmark Model/Part Requirement | A standard for a process-specific AM benchmark model/part is needed to enable verification and validation of applicable process simulation tools | Overall Part (specific features: Island arches and residual stress overhang) |
| Gap D28: Specification of Surface Finish | Specify what the relevant surface characteristic can be quantified to effectively make associations to performance | Internal channel and overhang(s). |

The physical constraints used to design the artifact are listed in Table 2 and were determined based on experience in sample preparation for metallographic analysis with ease of use, compact size, and experimental repeatability and reproducibility as criteria.

TABLE 2

Test Artifact Constraints:

| Feature | Constraint | Reason |
|---|---|---|
| Artifact Size | Should fit 50 mm metallographic mount | 50 mm is the largest standard metallographic mount to date |
| Artifact Shape | Must contain a flat area on all sides to allow for easy gripping, increasing cross-section accuracy | Allows for accurate and repeatable cross sectioning. |
| Sectioning Guides | Indicate where to section part | Measurement repeatability across all users |
| Interior Locator Marking | Must include three features to quantify location of cross-section | Quantify location of analysis within cross section |

Finally, additional features are included in Table 3 deemed important based on literature review.

TABLE 3

Additional features determined necessary from literature review:

| Feature | Reason |
|---|---|
| Residual Stress Overhang | Allow for residual stress approximation |
| Straight Through-Holes | Horizonal channels to conduct pressure drop testing |
| Chemical Analysis Coupons | Detachable coupons for chemical analysis |
| Complex Internal Channel | Powder removal testing and internal channel surface finish testing |

Dimensional accuracy in LPBF is principally controlled by the optical path, scan head, and build platform displacement. The primary function of the geometric features on a test artifact is to ensure the scanner system is operating as expected in terms of accuracy and repeatability across the build platform and that the selected scanning strategy produces a component that is geometrically accurate.

The test artifact was designed with an overall consideration that virtually any commercial LPBF system could produce it. The recommendation based on machine manufacturers, literature, and standards included a minimum unsupported overhang of 40° and minimum feature of 200 µm. With these constraints, features were included to quantify errors in scaling factors, beam compensations, and scanner drift. Detailed descriptions of features to quantify errors in scaling factors, beam compensations, and scanner drift can be found in several test artifact articles. The features used in the current artifact include: thin walls, pins, holes, rectangular extrusions, lattices, stochastic or periodic structures, and overhangs.

Chemical analysis is an important aspect of LPBF AM not only in characterizing and documenting feedstock chemistry but also in establishing the final chemistry in the fabricated components. Building titanium under 1000 ppm $O_2$ in the chamber can still increase oxygen content from 0.13% in the powder to 0.18% in the as-built part. As a result, a design requirement for the artifact was incorporation of a detachable feature for chemical analysis with a total volume sufficient (determined to be 1 $cm^3$) for inert gas fusion (typically OHN analysis) and inductively coupled plasma-optical emission spectroscopy (ICP-OES) analysis of common LPBF Alloys to include Al-base, Fe-Base, Ni-base, and Ti-base.

NASA MSFC-SPEC-3717 requires a qualified metallurgical process evaluate the as-built microstructure across relevant interfaces and aspects of a machine's scan strategy parameters to include downskins, contours, support/part interface, and more. Deviation in thermal history induced by geometry of the part is known to alter microstructure and impact anomaly generation. As a result, over ten specific various elements were designed for microstructure evaluation throughout the part that allowed for correlation of the location in the 2D cross-section with the overall 3D part. Fiducials (reference marks) were also included to assist with specific location determination for sectioning. The designed test artifact can be used for microstructure characterization including anomaly quantification such as size and frequency of porosity, and directly addressing AMSC Gap FMP5 and indirectly addressing gaps FMP1 and FMP4.

The aspects affecting performance of the LPBF-fabricated surface must be evaluated and quantified to address AMSC Gap P4, FMP5, and D28. Component geometry is known to affect surface integrity, and it is well known that overhanging and downfacing surfaces result in higher roughness values. The test artifact was designed to allow for characterization of 40° and 60° downfacing surfaces with contact and non-contact surface roughness measurement. Additionally, the subsurface was designed to be examined in the cross-section over the same features as the external measurements are made to further investigate surface integrity in terms of voids, microstructure, and microcracks.

Two issues commonly encountered when fabricating internal channels include (1) removal of powder from the channels post-fabrication, and (2) measuring and modifying (finishing) the surface of internal channels. To address development of powder removal techniques along with subsequent verification of powder removal, the test artifact includes a complex (helical) internal channel as well as two lattice structures. Previous examination of ultrasonic powder removal techniques on LPBF and electron beam PBF (EB-PBF) manufactured parts with complex internal channels has shown that as channels become tortuous and their diameter is reduced to 1 mm, powder removal becomes ineffective for LPBF parts. EB-PBF powder could not be cleared successfully due to inherent sintering of the powder during manufacturing. Evaluating weight loss and X-ray computed tomography (XCT) as means to verify powder removal has shown that only XCT was sufficient to confidently claim all powder had been cleared from internal channels. In the evaluation of the test artifact, it is anticipated that XCT will prove to be a very effective measurement means for evaluating powder removal, surface integrity, and porosity throughout the artifact.

In addition to powder removal, the test artifact internal channels and lattice features can be used to examine surface integrity and effectiveness of surface finishing techniques, e.g., sand blasting, vibro-finishing, and chemically assisted vibro-finishing on complex internal channels by cross-sectioning through the channel and performing surface roughness measurements. In the event that surface integrity and/or surface finishing techniques on internal channels are explored but cross sectioning is not viable, four horizontal straight channels (0.25, 0.5, 1, 2 mm in diameter) were included to allow for pressure drop testing. Currently, there is no LPBF standard for evaluating the effectiveness of non-contact surface finishing techniques, but the inventors see cross-sectioned channels and pressure drop testing as viable methods.

Due to the thermal cycling inherent in LPBF fabrication, residual stress and warpage become significant contributions to build failures, tolerance discrepancies, and mechanical properties. To minimize the effect of residual stress and thermal-induced warpage, many strategies have been employed that include: scanning strategy control, increased build platform temperatures, and post processing stress relief. Alternatively, it has become possible to simulate the build with commercial software available from Velo3D, ANSYS, and Autodesk Netfabb, for example, and preemptively distort the build file to accommodate for warpage so that the as-built component matches the desired product. AMSC Gap D9 requires the development of a representative test artifact to verify and validate the effectiveness of distortion simulation or residual stress reduction scan strategy.

Figure 1B:
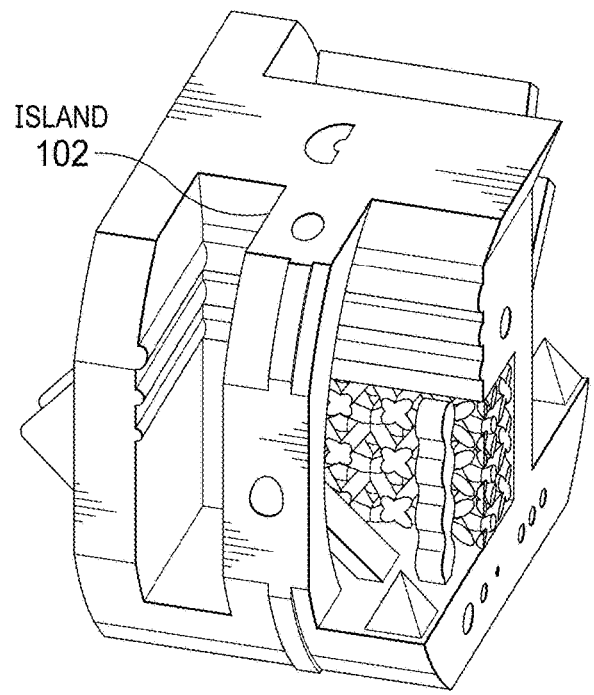
FIG. 1B depicts an isometric view of a design of a complete artifact including the island feature in accordance with an illustrative embodiment.
Figure 1C:
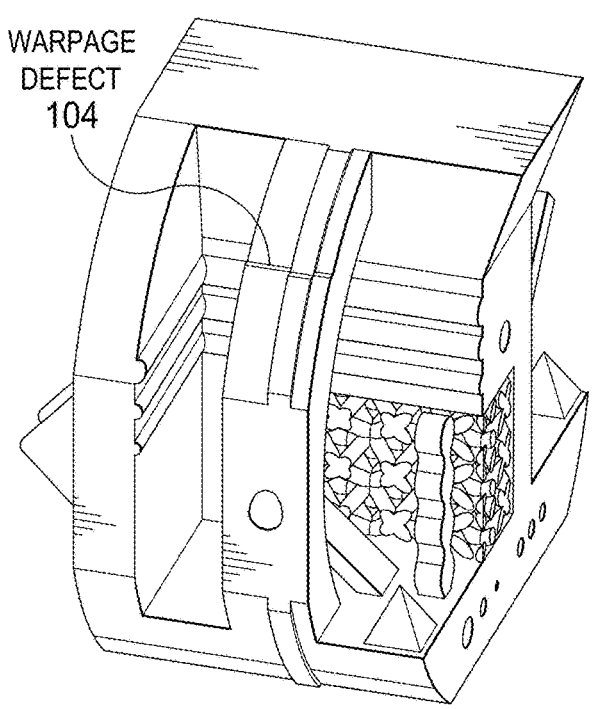
FIG. 1C depicts an isometric view of a manufactured artifact with a warpage defect in the island feature.

FIG. 1A depicts an isometric view of a design of a partial artifact including an "island" feature in accordance with an illustrative embodiment. FIG. 1B depicts an isometric view of a design of the complete artifact including the island feature in accordance with an illustrative embodiment. FIG. 1C depicts an isometric view of a manufactured artifact with a warpage defect in the island feature. The island feature 102 shows the effect of distortion. The horizontal warpage defect 104 is only visible in the feature that grew as an island and re-connected to the part. The wall adjacent to the feature shows no horizontal defect.

To evaluate simulation of distortion, an island according to the ISO/ASTM 52911-1-19 as shown in FIGS. 1A-1B was designed. An island refers to a feature that grows from a starting location surrounded by powder and later connects to another feature being built in the same build. These island features are susceptible to warpage and facilitate evaluation, even by eye, if there was any distortion as a horizontal discrepancy will appear near the layer of merging the island to the artifact body as seen in FIG. 1C.

Residual stress must be examined separately from distortion and can be utilized to evaluate support structures in addition to residual stress. To quantify residual stress, a flat overhang was created with wall supports that can be cut post-print to allow for the overhang to curl as it deforms under the residual stress. The artifact of the illustrative embodiments allows user defined supports to evaluate the effect of support structure on stress and to determine if a selected support is sufficient to prevent failure during a build. The island and overhang features allow for direct feedback into simulation tools and validation of their utility.

Comprehensive understanding of mechanical performance of specific, complex components is a major roadblock in adoption of LPBF, due to the many influencing fabrication parameters and geometry-specific properties that impact ultimate part performance. As a result, it is often required to include test coupons in every build, such as mentioned in NASA-MFSC-SPEC-3716, which specifies four tensile witness specimens to be included in every build of Class A or B components that are in continuous production. The similitude between witness coupons and real parts may vary due to the many variables affecting local thermal history during fabrication of actual components. Smaller coupons (18 mm tall) have shown promising results comparable to full size tensile bars, although this approach is not yet an accepted standard. Based on the need to relate process, microstructure, properties, and performance, it was determined critical to include mechanical testing coupons as a part of the test artifact. The illustrative embodiments use sub-size specimen in the test artifact, as full-size standard specimen are simply too large to maintain the artifact small and compact. The ASTM E8 sub-size round specimen with a gauge diameter of 4 mm and 2.5 mm, respectively, were chosen, and although ASTM E8 does not recommend utilizing sub-size dimension specimen (mainly due to difficulty in manufacturing small specimen as well as more stringent requirements to obtain reliable data during testing), this recommendation is not necessarily for AM-fabricated components. In fact, it is common to produce AM parts with thicknesses and features comparable to the sub-size standards. Further, it is also desirable to include the mechanical test coupons in the artifact to ensure a singular scan strategy is utilized to address potential issues related to the test artifact properties matching the mechanical test coupons. In the end, the inventors believe including the ability to measure mechanical performance in this single, compact test artifact, along with all of the other features, will provide an important all-in-one source for data leading to widespread adoption of the artifact, and ultimately, LPBF in production.

Figure 2:
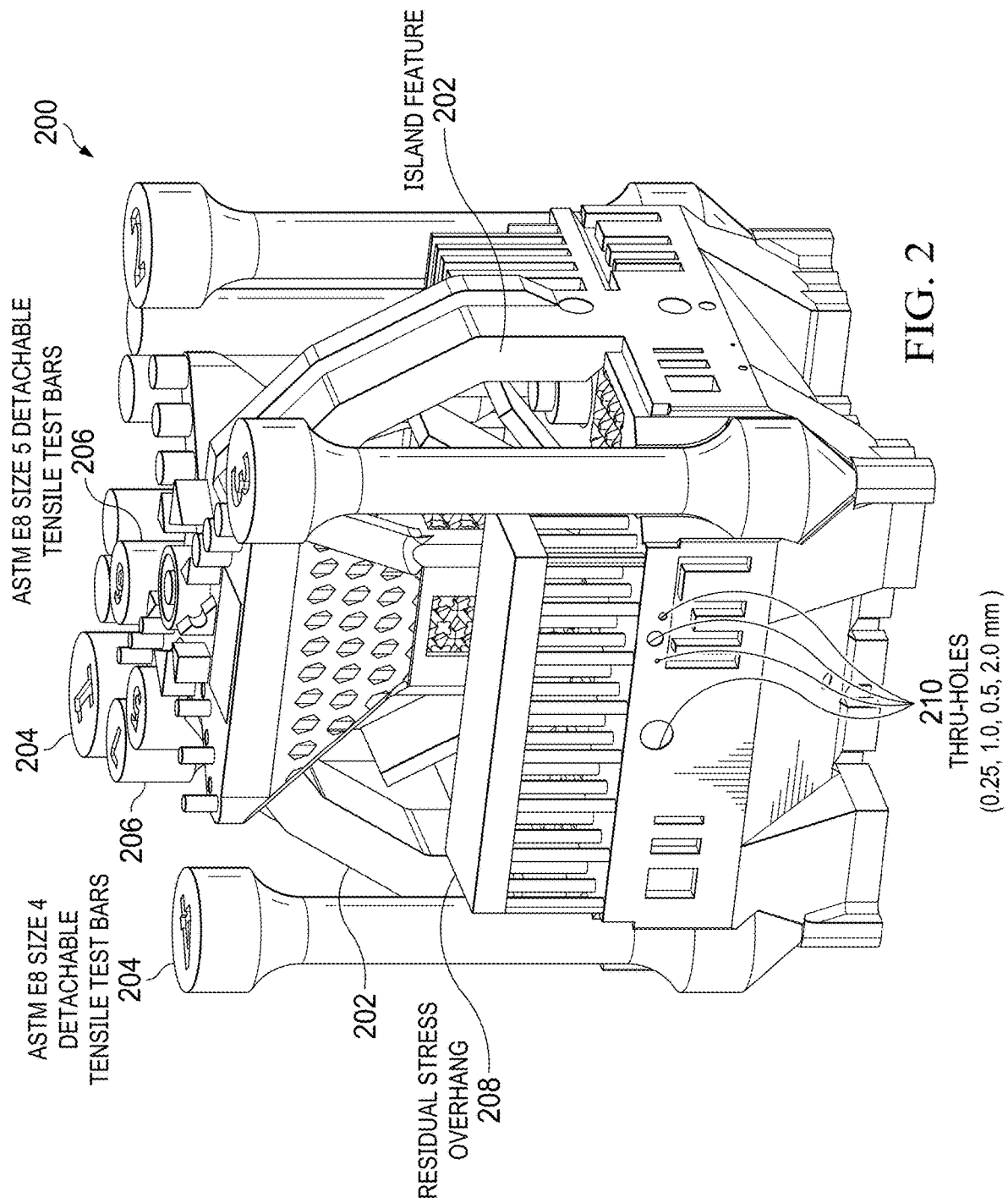
FIG. 2 depicts a side isometric view of a LPBF artifact in accordance with an illustrative embodiment.
Figure 3:
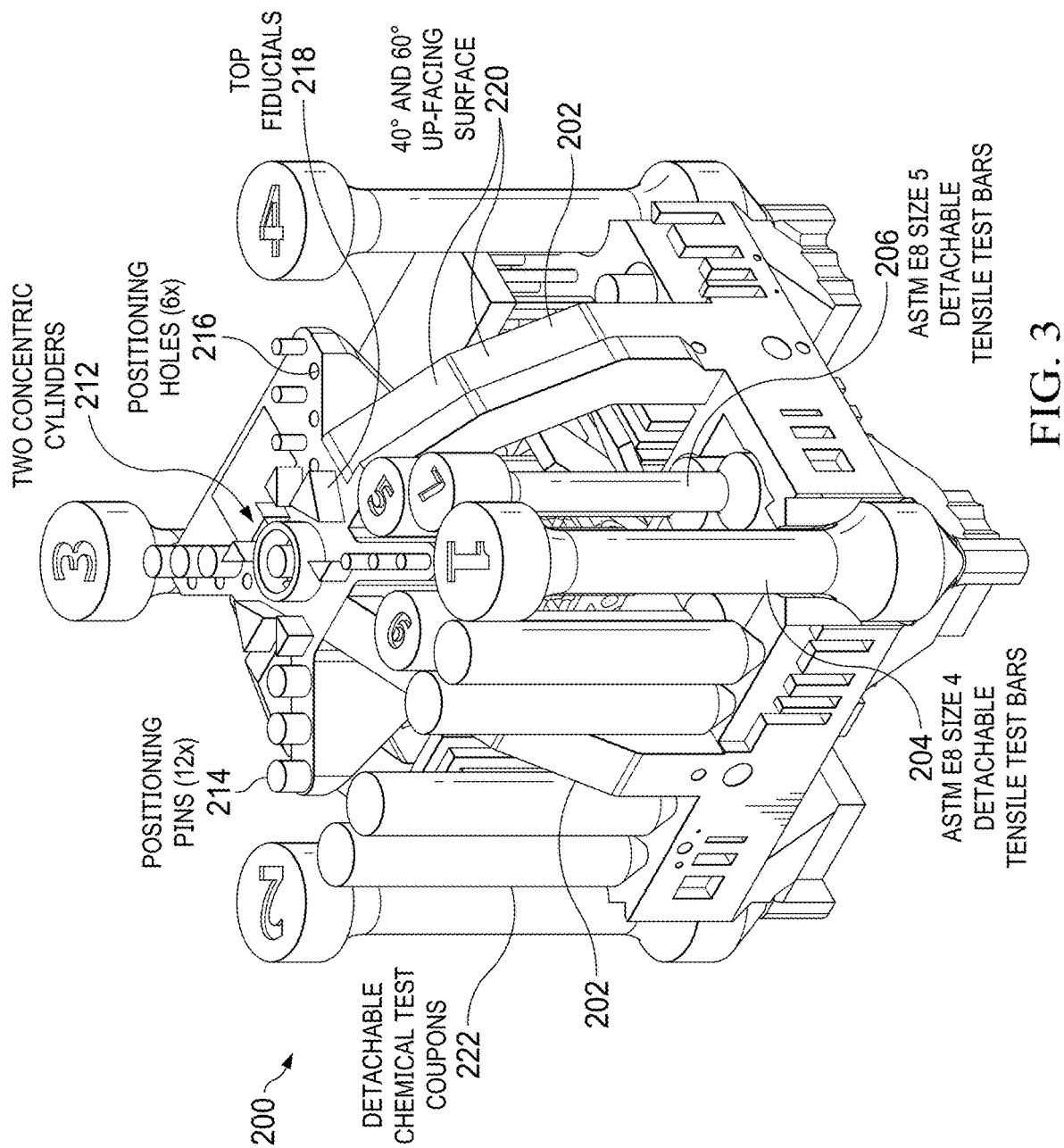
FIG. 3 depicts an isometric view of a second side of the LPBF artifact in accordance with an illustrative embodiment.
Figure 4:
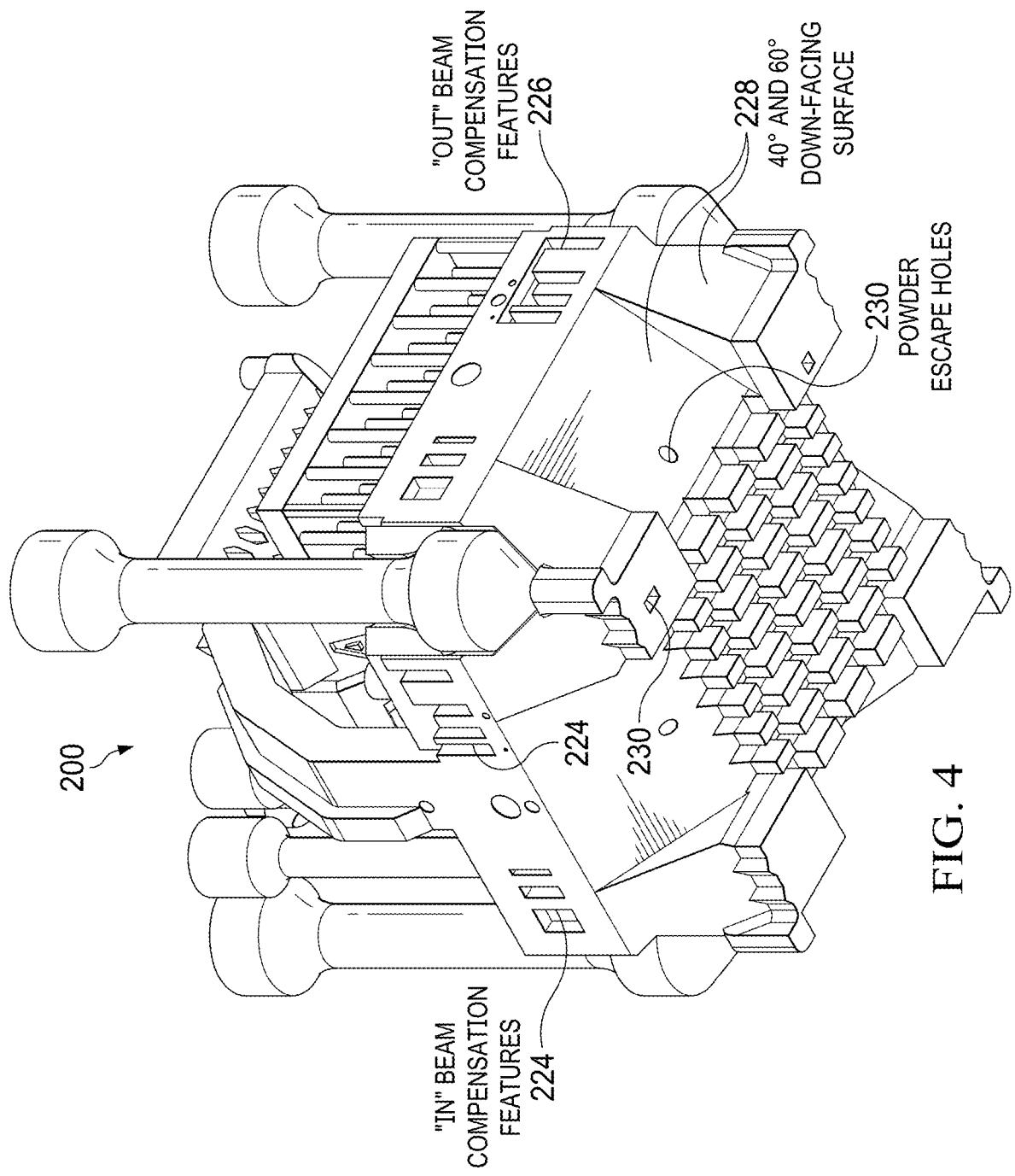
FIG. 4 depicts a bottom isometric view of a LPBF artifact in accordance with an illustrative embodiment.
Figure 5:
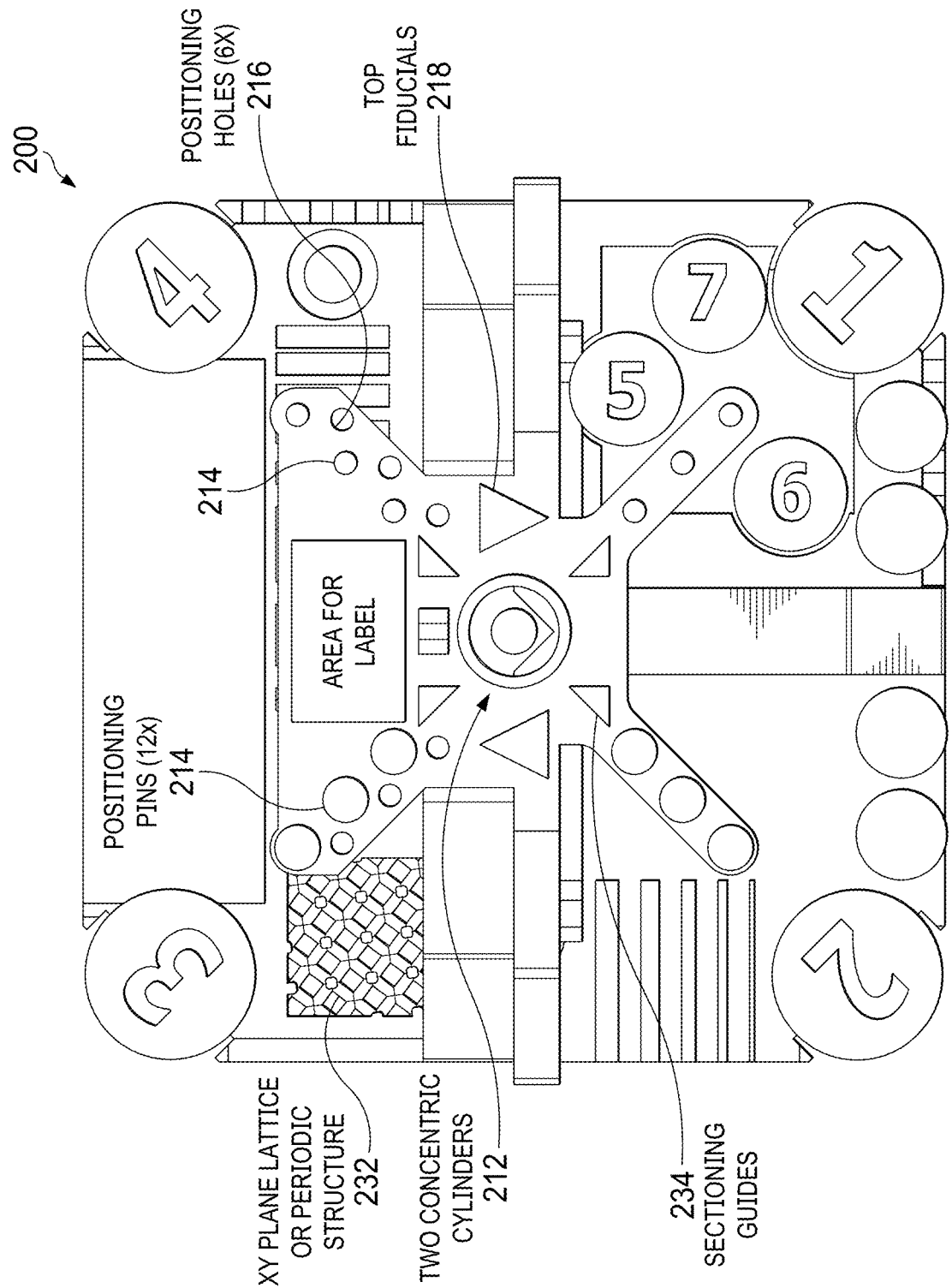
FIG. 5 depicts a top view of a LPBF artifact in accordance with an illustrative embodiment.
Figure 6:
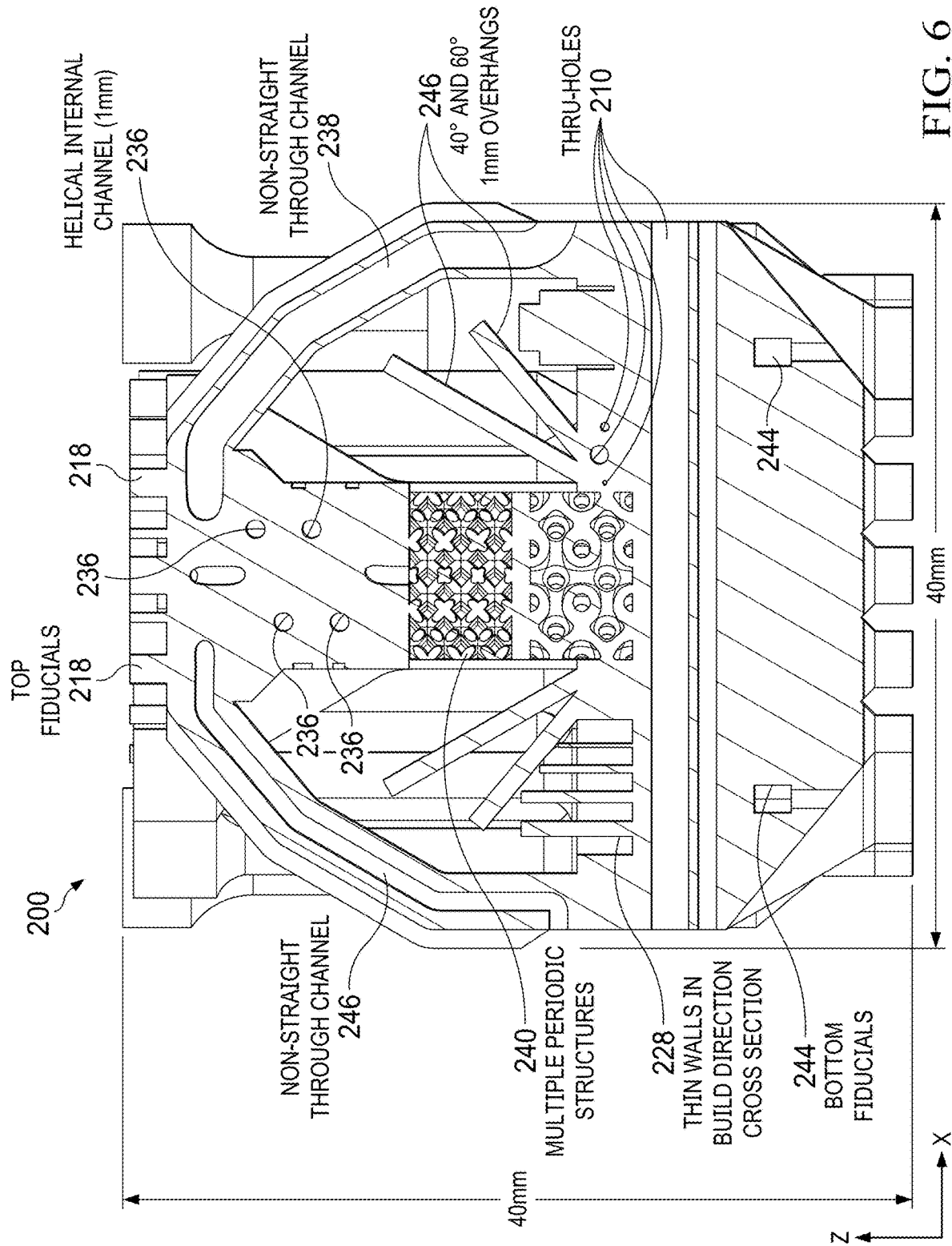
FIG. 6 depicts a cross-section of the artifact in the build direction in accordance with an illustrative embodiment.
Figure 7:
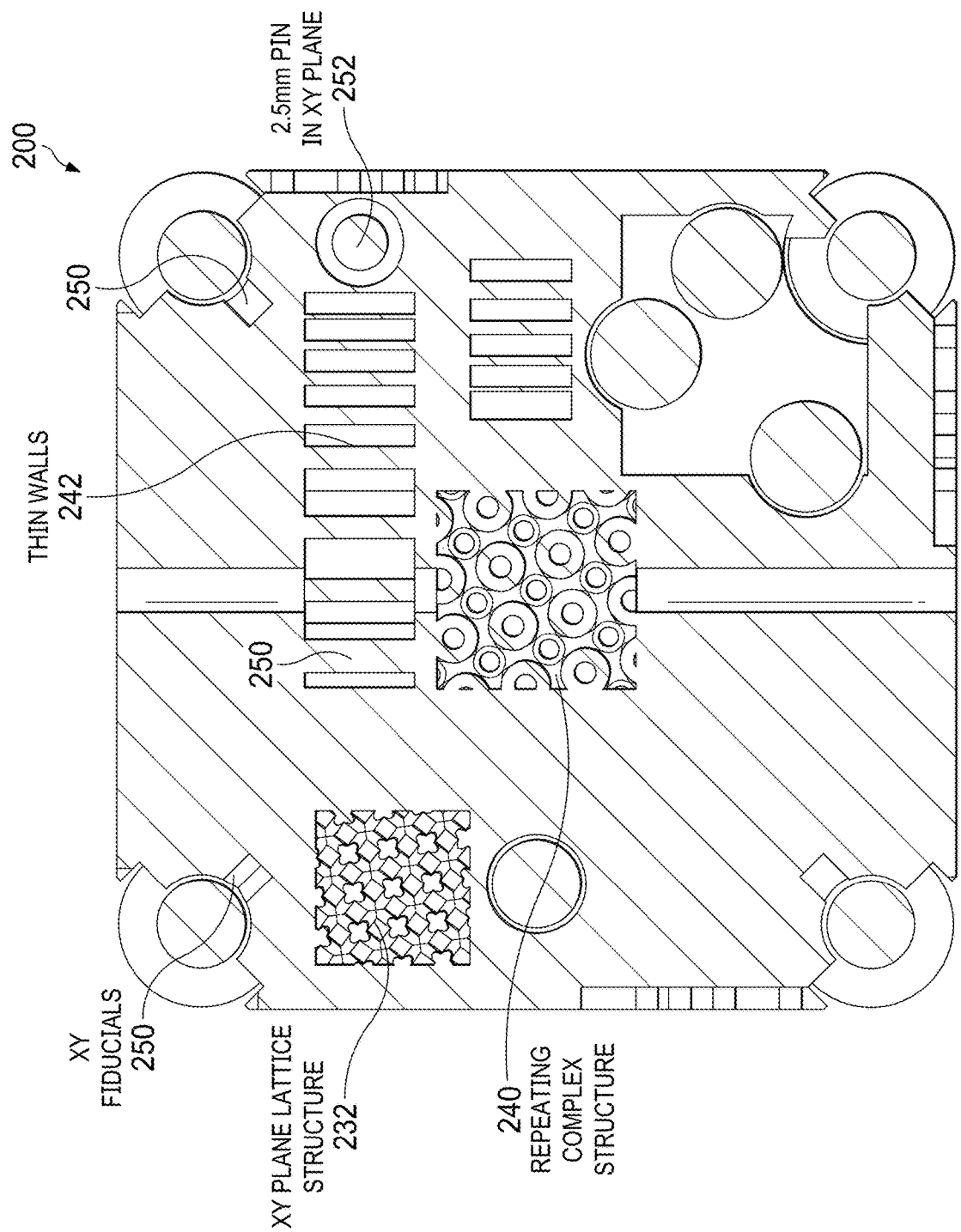
FIG. 7 depicts a cross-section view of the artifact in the x-y plane in accordance with an illustrative embodiment.

FIG. 2 depicts a side isometric view of a LPBF artifact in accordance with an illustrative embodiment. FIG. 3 depicts an isometric view of a second side of the LPBF artifact in accordance with an illustrative embodiment. FIG. 4 depicts a bottom isometric view of a LPBF artifact in accordance with an illustrative embodiment. FIG. 5 depicts a top view of a LPBF artifact in accordance with an illustrative embodiment. FIG. 6 depicts a cross-section of the artifact in the build direction in accordance with an illustrative embodiment. FIG. 7 depicts a cross-section view of the artifact in the x-y plane in accordance with an illustrative embodiment.

Based on the needs established and described above, a design, build, test, iterate approach was used to develop a single, compact LPBF test artifact with the following features:

- Detachable chemical test coupons 222 (providing at least minimum required volume to conduct routine OHN and ICP chemical analysis) (See FIG. 3)
- 40° and 60° overhangs 228 (in bulk material on each of four faces transitioning from bottom face to side faces) (See FIG. 4)
- Thin (1 mm thick) 40° and 60° overhangs 246 in three directions on mid-height shelf (See FIG. 6)
- Residual stress test overhang 208 (See FIG. 2)
- Straight internal channels 210 (Eight horizontal circular channels, two each of four different diameters) (See FIGS. 2 and 6)
- Complex internal channels 236, 238, 248, 254 (one vertical helical, 1 mm diameter channel) (See FIGS. 6, 8, and 9)
- Octet (0.5 mm strut thickness) type stochastic or periodic complex structures 232, 240 (See FIGS. 5, 6, and 7)
- Internal fiducials in cross section (embedded triangles 244, 250 for position determination) (See FIGS. 6 and 7)
- External sectioning guides 234 (raised profile) for sectioning locations in x-y, x-z, and y-z planes (See FIG. 5)
- 16 positioning pins 214 (four positioned radially along each of four directions on top shelf) and positioning holes 216 (See FIGS. 3 and 5)
- Two concentric cylinders 212 on centerline of top shelf (See FIGS. 3 and 5)
- Beam compensation features 224, 226 on all four faces in build direction and top shelf (See FIG. 4)
- Five vertical thin wall features 242 of different thicknesses (See FIGS. 6 and 7)
- Island features 202 with up-facing surface 220 (See FIG. 2)
- Detachable ASTM E8 Tensile bars (four specimen size four 204 and three specimen size five 206) (See FIGS. 2 and 3)

The artifact 200 shown in FIGS. 2-7 allows for quantification of dimensional accuracy measurements on all four vertically built faces and the top face. To assist with identifying minimum feature size manufacturability the test artifact includes (1) the thin walls 242 (0.2, 0.4, 0.6, 0.8, and 1 mm thick) and (2) the small horizontal thru-holes 210 with diameters (0.25, 0.5, 1 and 2 mm diameters) selected based on manufacturer recommended minimums discussed above.

The top shelf of the test artifact is primarily designed for dimensional analysis. The measurement methods and specific allowable tolerances can be specified by specific qualification/certification entities.

The addition of chamfered edges on the bottom section allows the artifact 200 to be oriented at a 45° angle of inclination to the raking direction, minimizing contact length as recommend by ISO/ASTM 52911-1. The chamfer is intended for measurement of overall part dimensions in the x and y directions to aid in quantification of scaling factors. The artifact 200 has the addition of six positioning holes 216 and 16 positioning pins 214 and located along four radial positions separated by 90° along the top surface to account for beam compensation and scaling errors.

The shelf of the artifact 200 may have a 45-degree angle hole through the base that enables dual use functionality of the 4 mm chemical test coupons 222 to act as go/no-go dimensional checks. This hole has a step diameter change from 4.15 mm down to 3.90 mm at 0.05 mm increments. The chemical test coupons 222 may include small witness lines every millimeter. By sliding the chemical test coupon into the holes, the user can quickly check for dimensional accuracy.

Four 21 mm tall, 4 mm diameter cylinders (chemical analysis coupons 222) were designed to be built with the artifact 200 and attached with a 1 mm diameter base to allow the user to easily break the coupons off the artifact after fabrication. The volume of the cylinders is determined by materials needs for chemical analysis by ICP-OES and inert gas fusion methods suggested in ASTM F3302-18 and ASTM F3055 for titanium and nickel alloys.

Sectioning guides 234 are configured to guide sectioning of the artifact 200 in two perpendicular planes. The artifact cross section combines specific qualification guidelines set forth in NASA MSFC-STD-3717 section A 4.2.3.1 and common metallographic limitations. The artifact 200 can create a wide range of thermal histories by including overhangs 208, 246, islands 202, thin features 242, channels 236, 238, 248, 254 stochastic or periodic structures 232, 240, and bulk areas to determine microstructure and anomaly population effects as a function of geometry. Artifact 200 may comprise at least three geometries that are unique from each other when exposed in cross section. These geometries may be formed similarly both in the build direction plane, any plane parallel with the Z axis of the artifact and normal to the build direction plane (ISO/ASTM 52921 Terminology for Additive Manufacturing-Coordinate Systems and Test Methodologies). The maximum width of the cross section in XY, XZ, and YZ planes is 40 mm to allow the artifact 200 to comfortably fit (determined through experience) inside a 50 mm mount, reducing likelihood for errors in polishing. Each one of the cross-section faces reveals a surface area greater than 6 $cm^2$, which is the minimum area of measurement recommended in the NASA MSFC-STD-3717. The artifact 200 is built in the Z direction so that the Z axis is parallel to the tensile and chemical test bars 204, 206, 222.

DIN ISO 4288 was used to establish the minimum measuring conditions for the commonly reported surface roughness ranges seen in LPBF of Ra 5 μm-60 μm. For a traditional contact stylus, the minimum recommended travel length is 8 mm for Ra values larger than 10 μm. The lower section of the test artifact includes 40° and 60° bulk overhang surfaces 228 on all four faces (shown in FIG. 4). Each of these overhanging surfaces has a measurable area >1.2 cm$^2$ and total length >8 mm along the overhang surface in the build direction. Powder escape hole 230 allow removal and for epoxy infill during the mounting process prior to polishing. They help ensure the repeated quality of the polishing and subsequent analysis of the cross section.

Figure 8:
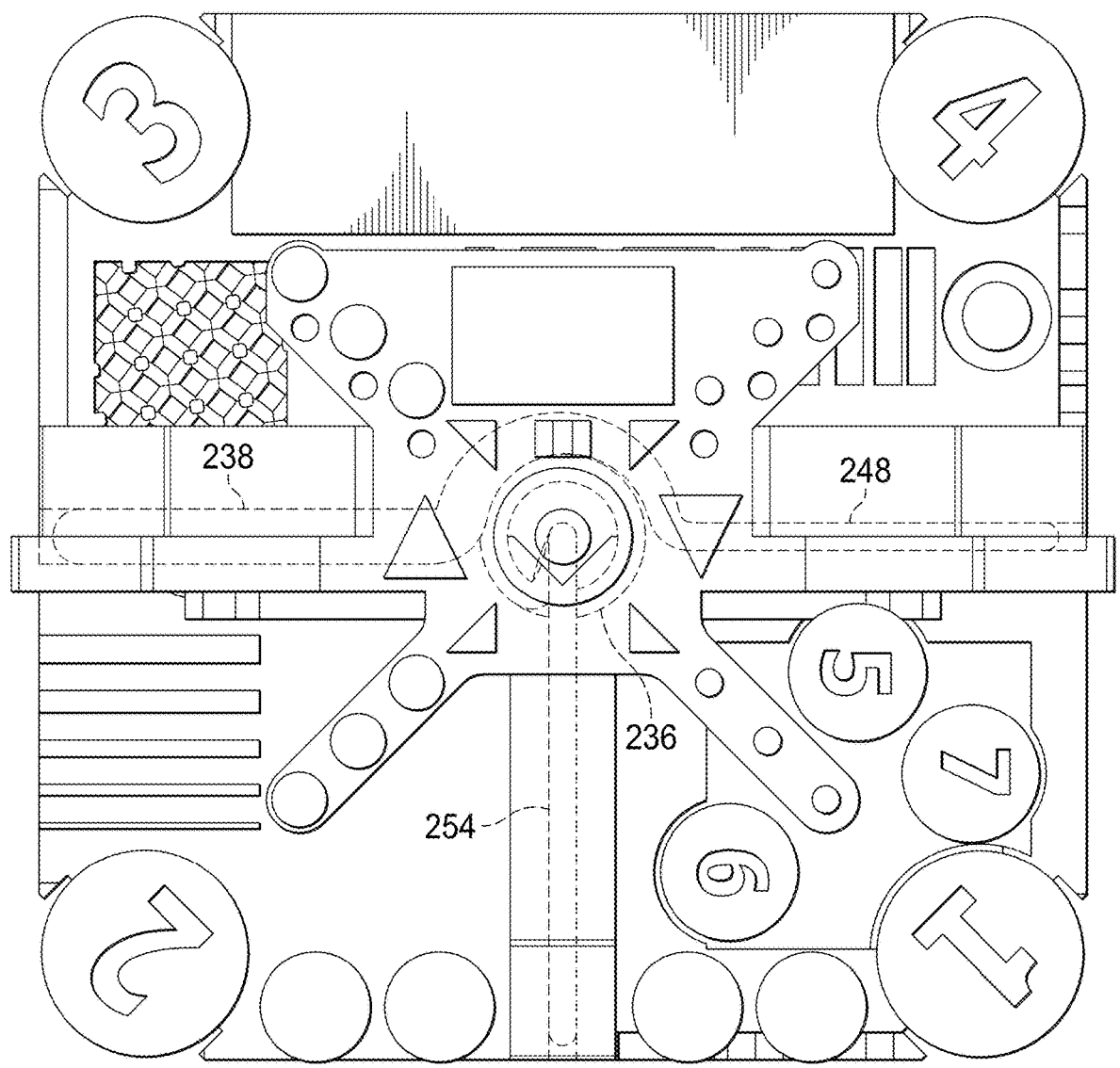
FIG. 8 depicts a top view of a wire diagram of a test artifact highlighting an internal passageway utilized to test powder removal and surface finish/finishing of internal features in accordance with an illustrative embodiment.
Figure 9:
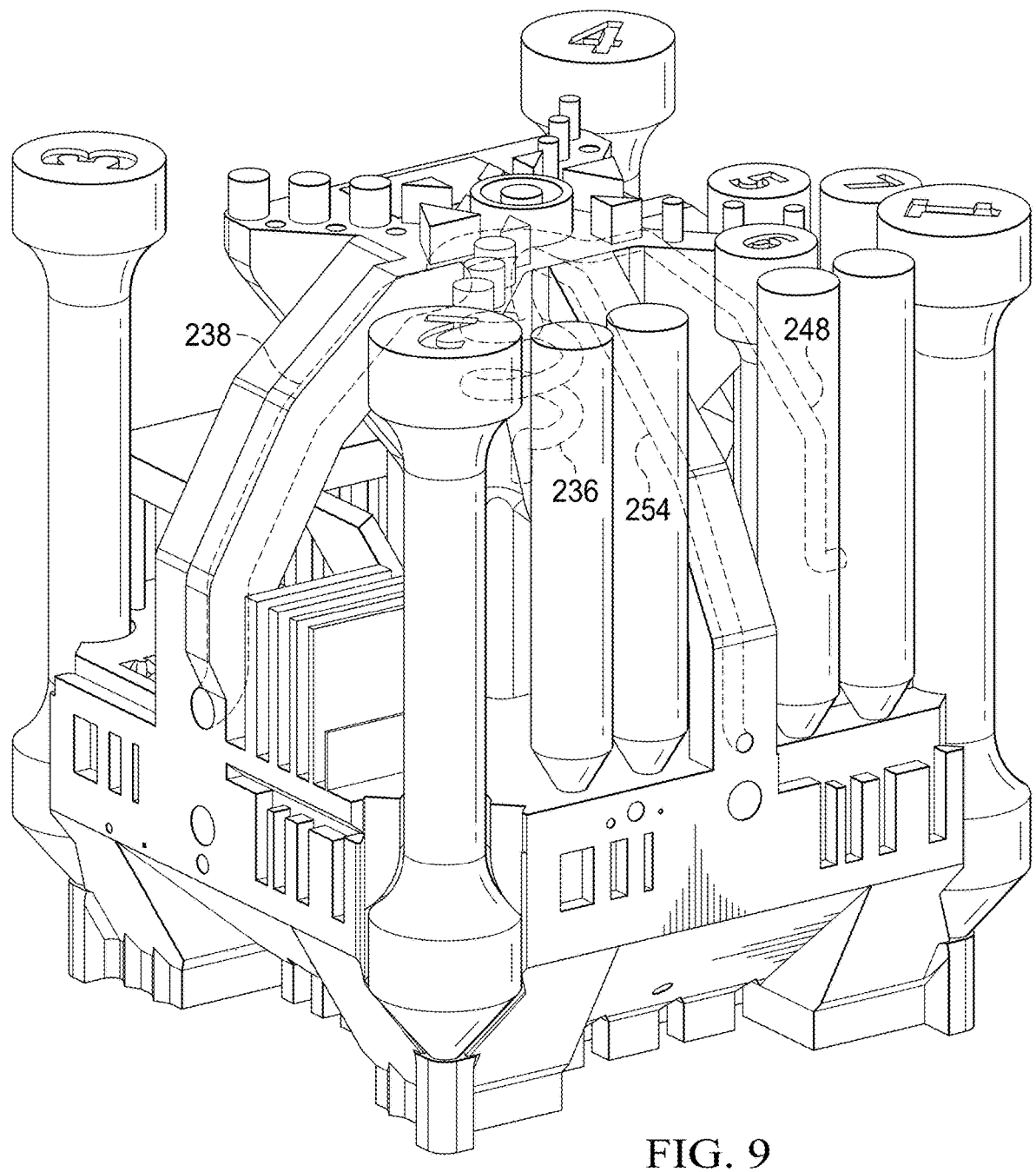
FIG. 9 depicts an isometric view of the wire diagram on the artifact in accordance with an illustrative embodiment.

FIG. 8 depicts a top view of a wire diagram of a test artifact highlighting an internal passageway utilized to test powder removal and surface finish/finishing of internal features in accordance with an illustrative embodiment. FIG. 9 depicts an isometric view of the wire diagram on the artifact in accordance with an illustrative embodiment.

A complex helical internal channel 236, with inner diameter of 1 mm, was included in the final design with the purpose of studying powder removal and internal surface finishing techniques as discussed above. Non-straight through channels 238, 248, 254 through the arches of the islands 202 are also included to test powder removal and internal channel post processing. The locations of these channels coincide with the Z plane cross section to allow for destruction inspection during metallography. The combination of some non-linear channel and helical channel 236 is bisected during any cross sectioning in the Z plane.

FIGS. 8 and 9 highlight the path of the complex internal channels through the test artifact. Additionally, straight holes in each face with diameters of 0.25, 0.5, 1, and 2 mm are available for pressure drop testing and manufacturability based on work done by Kolb et. al. The straight thru-holes 210 are depicted in FIG. 2, while FIG. 6 illustrates sectioning the part in the x-z plane and exposing the internal helical channel 236 as well as one 2 mm diameter thru-hole to allow for surface integrity analysis.

Figure 10:
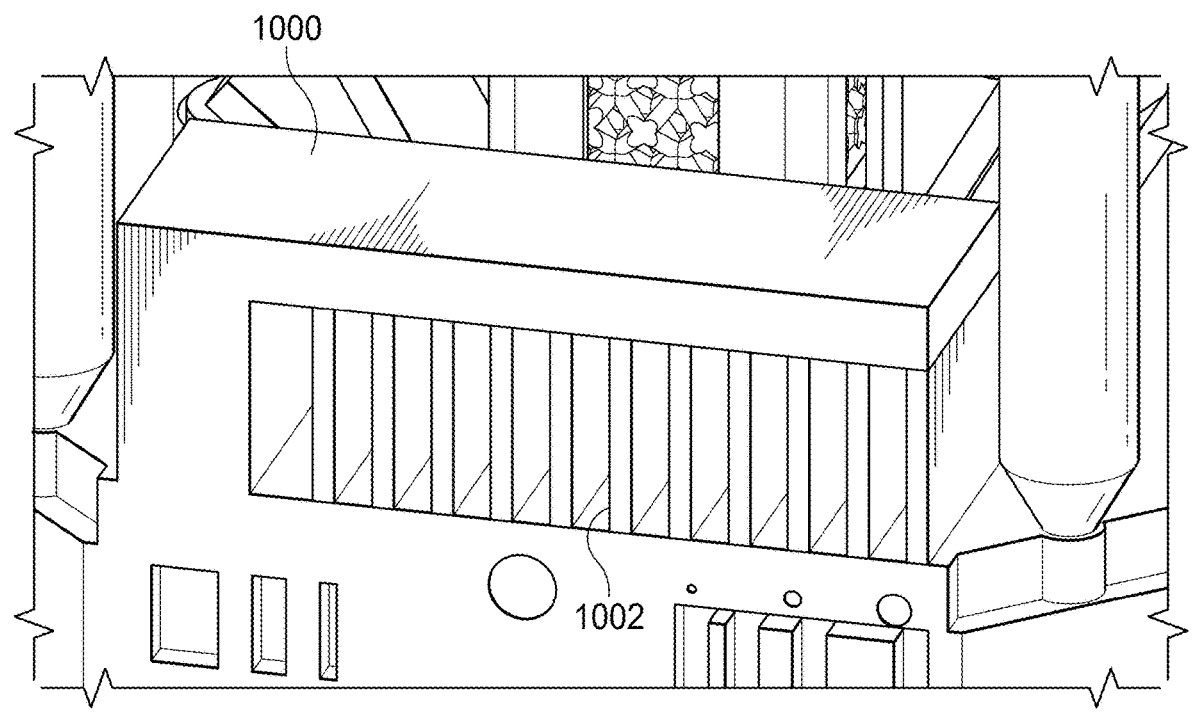
FIG. 10 depicts an isometric view of a residual stress overhang with a standard support structure in accordance with an illustrative embodiment.

FIG. 10 depicts an isometric view of a residual stress overhang 1000 with standard support structures 1002 in accordance with an alternative illustrative embodiment. The support structures 1002 can be cut post-print. Current and future simulation software allow users to predict distortion induced by residual stress, and in some cases, auto-distort the geometry to accommodate the predicted distortion, increasing as-printed accuracy.

The test artifact includes (but is not limited to) three islands 202 (see FIGS. 2 and 3) that later reconnect to the center of the artifact as suggested in ISO/ASTM52911-1-19. The island 202 is analyzed for any ridge or visible layer line at the point of merging with the main body of the artifact. This feature can be used as a go/no-go check or can be quantified to feedback into the simulation software, modify scan strategy, increase platform temperature. Additionally, a residual stress overhang structure 208 was designed with dimensions of 8×20×2 mm (see FIG. 2). Residual stress overhang 208 can be completely detached from the artifact 200 to allow for examination separately form the artifact. This ability allows for as-built residual stress evaluation and the remaining artifact to be evaluated in the heat-treated condition if desired. Using the structure, quantification and qualification of residual stress minimization strategies, support structure optimization, and residual stress predictions can be performed using the curvature method or other methods including deflection method and contour method. Furthermore, stress relief and thermal cycles can also be evaluated.

Figure 11:
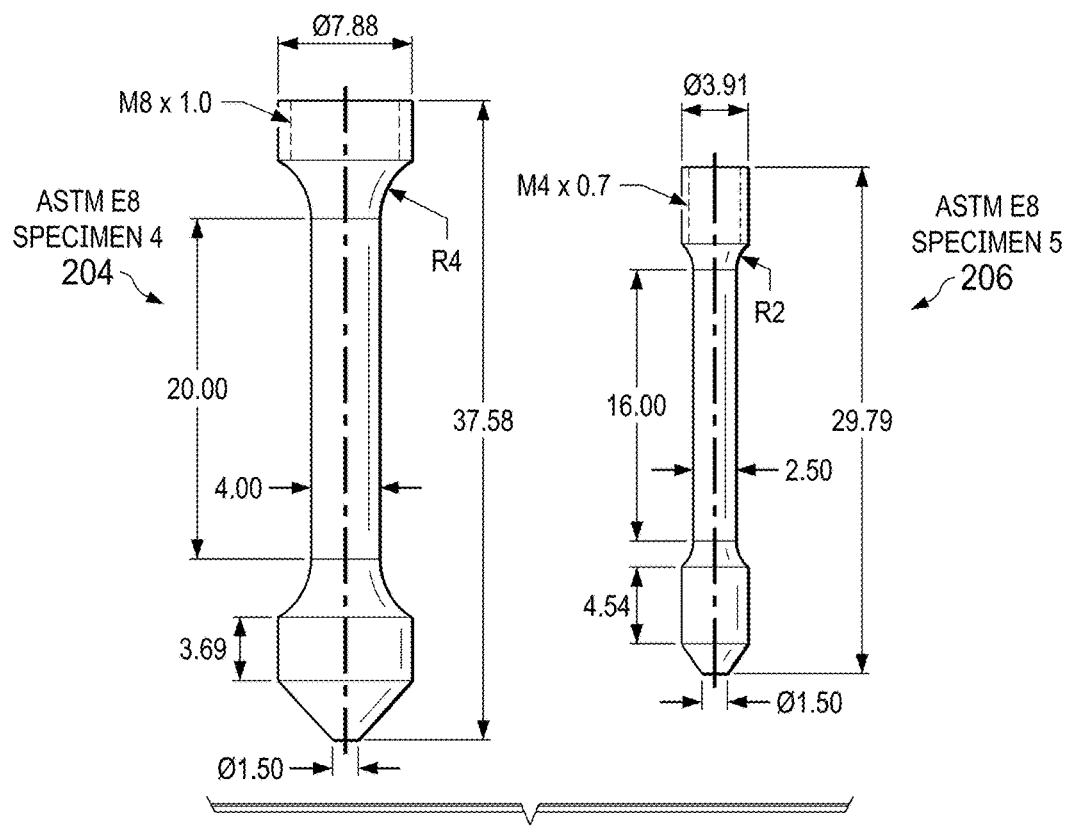
FIG. 11 depicts a diagram illustrating ASTM E8 subspecies specimens of the artifact in accordance with an illustrative embodiment.

FIG. 11 depicts a diagram illustrating ASTM E8 subspecies specimens of the artifact in accordance with an illustrative embodiment. Using currently available standards for mechanical testing limits the testing to tensile measurements. As discuss above ASTM E8 specimens were selected and the exact dimensions (in mm) of the specimens are shown. The available locations for the tensile specimens were limited due to the height requirements and ultimately sub-size specimen 4 204 was added to the four corners of the artifact 200 and sub-size specimen 5 206 is included in a group on one quadrant.

The ASTM E8 specimens 204, 206 and chemical testing coupons 222 may be designed to be snapped off the artifact by hand or cut off with an instrument, reducing post process equipment needs and reducing analysis costs. Pin 252 in the XY plane is included to allow for metallography analysis on a geometry with similitude to the ASTM tensile bars 204, 206. (See FIG. 7)

A central feature to the artifact's utility is the ability to quantify microstructural architectures in a variety of geometries that are known to experience thermal history extremes. Thermal history represents temperature over time. The time frames of interest are a vector-based time frame on the order of hundreds of microseconds, a layer based time frame on the order of tens of seconds, and a build based time frame on the order of hours to days. Materials science phenomena occur over different time frames, and "thermal history" is a catch all for them all. The part geometry can affect the thermal history in all time frames. Artifact 200 comprises at least three fiducials positioned for identification of locations in cross-section after sectioning of the artifact. Included are the fiducials 218, 244, 250 (See FIGS. 5 and 6) that serve as cross-section fiducials in the XY and XZ planes to maintain consistent sectioning practices and identify the precise location of the sectioned plane with the artifact.

The fiducials 218, 244, 250 allow for relating all data gathered from one artifact cross-section, such as microstructure, defect size, defect shape, and geometric features, to any other artifact. A fiducial's width or pixel location within an image can be used to calculate a coordinate. The knowledge of three coordinates in a plane combined with the knowledge of the location relative to other features in the artifact from the digital file allow the calculation of the normal vector to the sectioned plane and from there every pixel in the image can be assigned a true coordinate in a unified coordinated system.

In the present example, there are two stochastic or periodic structures 240 fabricated along a central vertical section as shown in FIGS. 6 and 7. These periodic structures can be changed depending on the needs of the user. Due to the inherent delays in printing the stochastic or periodic structures, they can be used to quantify effective building speed.

Figure 12:
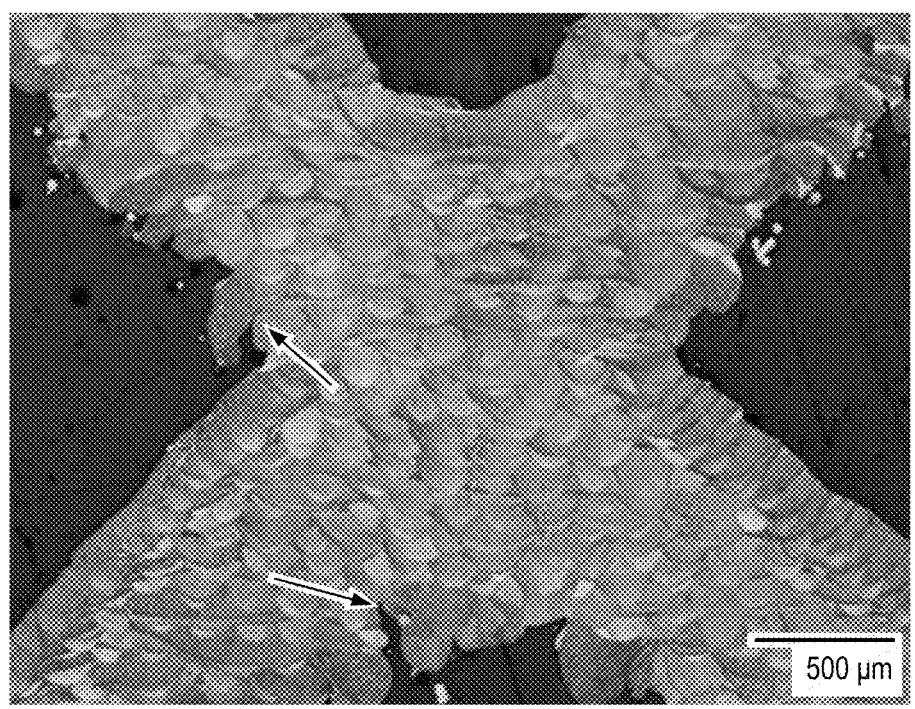
FIG. 12 depicts a cross-section view of an IN718 Lattice as-built on EOS M290, polished, and etched in accordance with an illustrative embodiment.

FIG. 12 depicts a cross-section view of an IN718 Lattice as-built on EOS M290, polished, and etched in accordance with an illustrative embodiment. The arrows indicate sharp in-cut features in the down skin area that would be undetectable to most surface characterization methods due to obscured line-of-sight and steepness of flaw. The ability to quantify microstructure and surface integrity of lattice features helps to address gaps P4, FMP5, and PC4 from the AMSC roadmap. The as-built lattice area of the IN718 lattice shows apparent surface integrity differences on the up-skin and down skin areas due to laser scanning and thermal history variations. FIG. 12 is a singular low magnification (50×) micrograph from the lattice area, but the part is intended to be fully mapped to quantify microstructure holistically.

The cross-section view in FIG. 6 further highlights that the entirety of the artifact is available for microstructure analysis and is intended to allow research activity to move away from microstructure investigation on simple cubes and toward more realistic geometries, adding significant value to qualification efforts.

The test artifact chemical analysis coupons 222 manufactured on the Aconity One LPBF machine using Ti6242 powder (and 550° C. pre-heat bed temperature) were broken off by hand and used to examine oxygen pick up via inert gas fusion. The oxygen content increased from 0.14 wt % in the feedstock to 0.21 wt % in the as-built condition. The increase of oxygen content is likely due to the 550° C. pre-heat of the build plate in spite of chamber oxygen content being controlled to below 200 ppm. The higher pre-heat reduces residual stress but also increases oxygen uptake. This analysis was provided to demonstrate the utility of the chemical analysis test coupons. As mentioned above, the coupons are designed to include sufficient minimum 0.5 cc required volume for inert gas fusion and ICP-OES analysis of commonly used LPBF alloys.

There are at least 98 features on the artifact 200 that can be measured for dimensional accuracy determination. The features are divided among all four building direction faces and the top shelf allowing for comprehensive geometric dimensioning and tolerancing (GD&T) analyses. GD&T comprises defining engineering tolerances that describe nominal geometry (dimensions) and allowable variations of accuracy and precision for manufactured parts. GD&T employs symbolic language in engineering drawings and computer-generated models. Several organizations such as the American Society of Mechanical Engineers (ASME) and the International Organization for Standardization (ISO) have promulgated respective GD&T standards.

Although the artifact 200 contains many quantifiable features, it is compact and comprises a singular continuous body of less than 100 cc (cm$^3$) and greater than 6 cc in bounding box volume. Artifact 200 is less than 50 cc and greater than 3 cc in solid body. An embodiment only occupies a volume of 25 cc that comfortably fits within a standard 50 mm metallographic mount. The small footprint is critical to gaining industry-wide adoption as cost is directly proportional to component size and the compactness allows for multiple to be built simultaneously or at build plate extremes. The proposed artifact has been designed to represent realistic complexity seen in the LPBF process and can be used to quantify machine to machine variation in quality. However, artifact 200 does not have to fit within 50 mm mounts and can be built anywhere within a build chamber in three-dimensional space.

Additive manufacturing quality can be tested by additively manufacturing the artifact 200 and then sectioning the artifact in one of the perpendicular planes according to the sectioning guides 234. Mechanical and/or chemical testing can then be performed on the features of the artifact.

Implementation of the test artifact will directly address needs of 13 standards gaps identified by AMSC and it can be used as a test artifact in process qualification under the guidelines laid out in the NASA MFSC-SPEC-3717. Widespread adoption along with standardized data collection methods will accelerate the development of zone-specific anomaly size and frequency distribution for a given machine, feedstock and process parameter set. Quantitative knowledge of the LPBF anisotropy in terms of defects can then be used to intelligently develop representative mechanical property testing. Ultimately, this will lead to the establishing of exceedance curves that are required to develop a probabilistic damage tolerance framework to evaluate component failure probability.

The above artifact is described in relation to laser powder bed fusion, also known as Selective Laser Melting, Direct Metal Laser Solidification, Direct Metal Laser Melting, Laser Beam Melting, and other names. However, it should be noted that the artifact and the methods described above can be used to qualify any additive manufacturing method. Specifically, the artifact can be applied to other Powder Bed Fusion additive manufacturing processes, such as Electron Beam (EB) PBF, also known as Electron Beam Melting and other names. Those skilled in the art recognize challenges associated with powder removal in EB-PBF as well as other differences between EB-PBF and L-PBF such as surface roughness, minimum feature capabilities, etc. Those skilled in the art recognize that modifications to the current qualification test artifact can be made to accommodate the manufacturing capability differences of the particular technology under study without loss of the inventive features of the artifact.

The artifact can also reasonably be applied to metal Binder Jetting additive manufacturing (e.g., ExOne, HP, and Desktop Metal). Again, those skilled in the art recognize that modifications to the current qualification test artifact can be made to accommodate the manufacturing capability differences of the particular technology under study without loss of the inventive features of the artifact.

In addition to metals, the illustrative embodiments can be applied to different materials (e.g., polymer particles for laser and ceramic particles for binder jetting). Those skilled in the art recognize that modifications to the current qualification test artifact can be made to accommodate the manufacturing capability differences of the particular technology under study without loss of the inventive features of the artifact.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The diagrams in the different depicted embodiments illustrate the architecture, functionality, and operation of some possible implementations and methods in an illustrative embodiment.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A test artifact for additive manufacturing, the artifact comprising:
an additively manufactured singular continuous body between 100 cc and 6 cc in bounding box volume and between 50 cc and 3 cc in solid body, the body comprising:
at least three fiducials positioned for identification of locations in cross-section after sectioning of the artifact, wherein the fiducials comprise a set triangles on a top shelf of the test artifact and a set of embedded triangles inside the test artifact that serve as cross-section fiducials in the XY and XZ planes; and
three island arch features, wherein two of the island arch features extend in opposite directions from the top shelf of the test artifact and the third island arch feature extends from the top shelf of the test artifact in a direction orthogonal to the other two island arch features.

2. The test artifact of claim 1, further comprising a number of sectioning guides configured to guide sectioning of the artifact in two perpendicular planes.

3. The test artifact of claim 1, further comprising a number of detachable components configured for mechanical analysis of manufacturing quality of the artifact.

4. The test artifact of claim 3, wherein the detachable components comprise ASTM E8 tensile bars.

5. The test artifact of claim 1, further comprising a number of detachable chemical test coupons.

6. The test artifact of claim 5, wherein the chemical test coupons comprise minimum required volume for inert gas fusion and inductively coupled plasma-optical emission spectroscopy analysis of power bed fusion alloys.

7. The test artifact of claim 1, wherein the continuous body comprises a number of internal channels.

8. The test artifact of claim 7, wherein one of the channels is helical.

9. The test artifact of claim 1, wherein the continuous body comprises a residual stress overhang.

10. The test artifact of claim 1, wherein the continuous body comprises a number of straight through holes with different respective diameters.

11. The test artifact of claim 1, wherein the continuous body comprises a number of overhangs with 40° or 60° downfacing surfaces.

12. The test artifact of claim 1, wherein the continuous body comprises a number of stochastic structures.

13. The test artifact of claim 1, wherein the continuous body comprises a number of periodic structures.

14. The test artifact of claim 1, wherein the continuous body comprises a number of positioning pins located on the top shelf of the artifact.

15. The test artifact of claim 1, wherein the continuous body comprises a number of positioning holes located on the top shelf of the artifact.

16. The test artifact of claim 1, wherein the continuous body comprises a number of concentric cylinders on a centerline of the top shelf of the artifact.

17. The test artifact of claim 1, wherein the continuous body comprises a number of wall features of differing respective thickness.

18. The test artifact of claim 1, wherein the continuous body comprises a number of beam compensation structures on side surfaces of the artifact.

19. The artifact of claim 1, wherein the artifact is additively manufactured by one of:
laser powder bed fusion;
electron beam powder bed fusion; or
binder jetting.

20. The artifact of claim 1, wherein each of the structures are formed similarly both in a build direction plane of the artifact and normal to the build direction plane.

21. A test artifact for additive manufacturing, the artifact comprising:
an additively manufactured singular continuous body between 100 cc and 6 cc in bounding box volume and between 50 cc and 3 cc in solid body, the body comprising:
at least three fiducials positioned for identification of locations in cross-section after sectioning of the artifact, wherein the fiducials comprise a set triangles on a top shelf of the test artifact and a set of embedded triangles inside the test artifact that serve as cross-section fiducials in the XY and XZ planes;
three island arch features; and
a detachable ASTM tensile bar at each of four corners of the test artifact.

22. A test artifact for additive manufacturing, the artifact comprising:
an additively manufactured singular continuous body between 100 cc and 6 cc in bounding box volume and between 50 cc and 3 cc in solid body, the body comprising:
at least three fiducials positioned for identification of locations in cross-section after sectioning of the artifact, wherein the fiducials comprise a set triangles on a top shelf of the test artifact and a set of embedded triangles inside the test artifact that serve as cross-section fiducials in the XY and XZ planes;
three island arch features extending from the top shelf of the test artifact; and
non-straight through channels enclosed within each of the island arch features.

* * * * *